Sept. 29, 1964  H. G. WASHBURN  3,150,410
SAUSAGE STUFFING MACHINE
Filed Jan. 5, 1962  11 Sheets-Sheet 1

INVENTOR.
Harry G. Washburn,
BY
Robert R. Lockwood
atty.

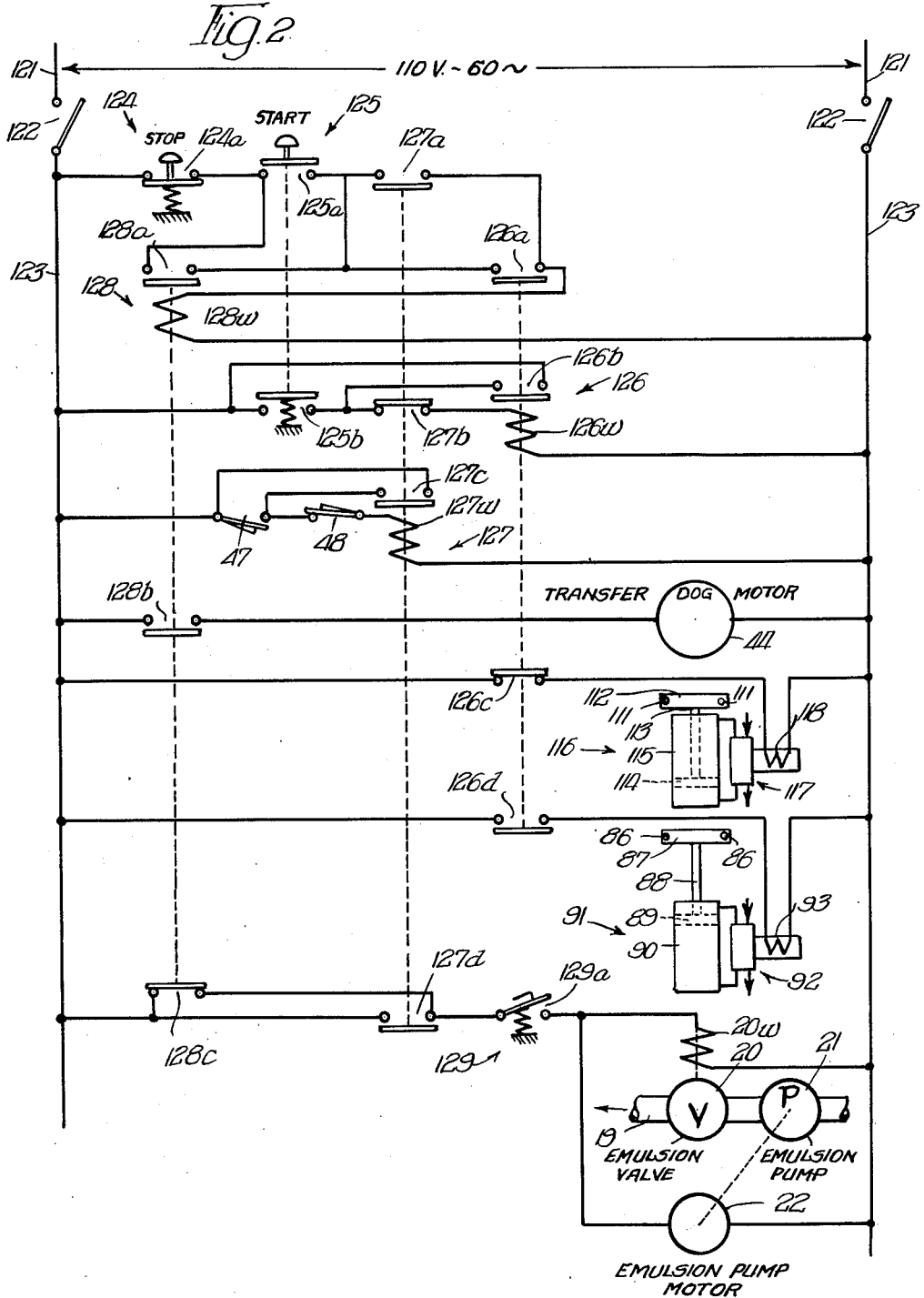

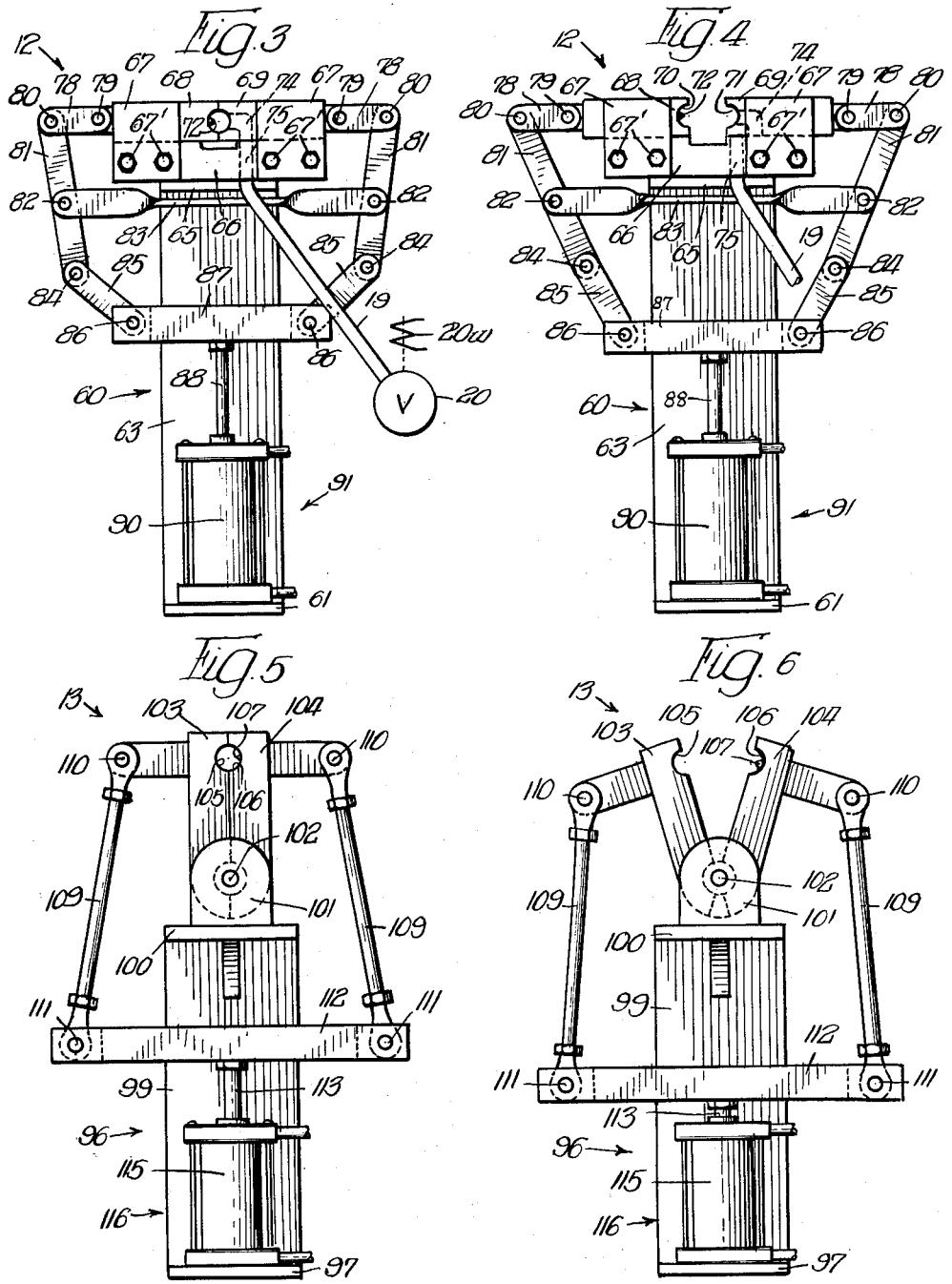

Sept. 29, 1964 H. G. WASHBURN 3,150,410
SAUSAGE STUFFING MACHINE
Filed Jan. 5, 1962 11 Sheets-Sheet 4
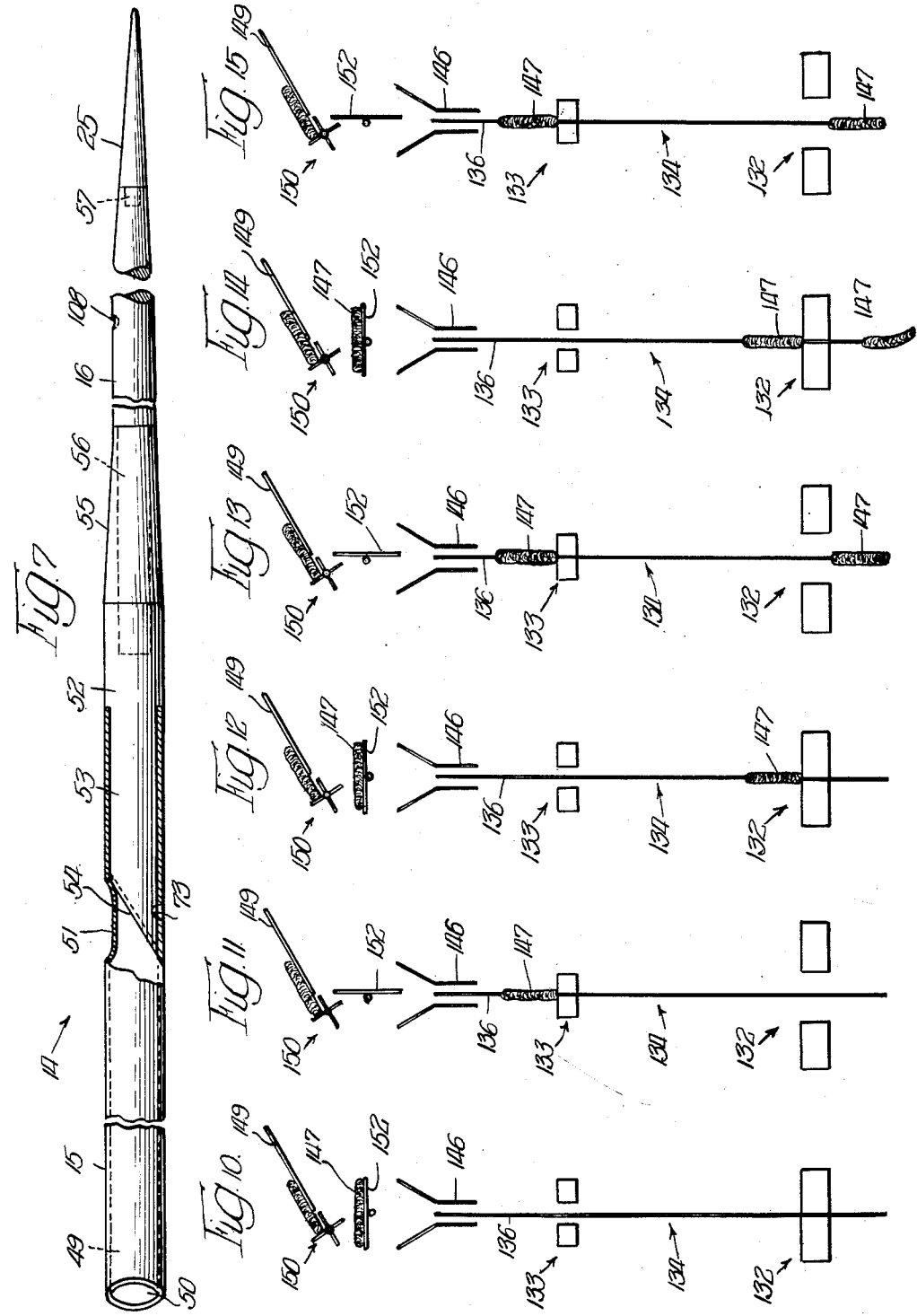

Sept. 29, 1964  H. G. WASHBURN  3,150,410
SAUSAGE STUFFING MACHINE
Filed Jan. 5, 1962  11 Sheets-Sheet 5
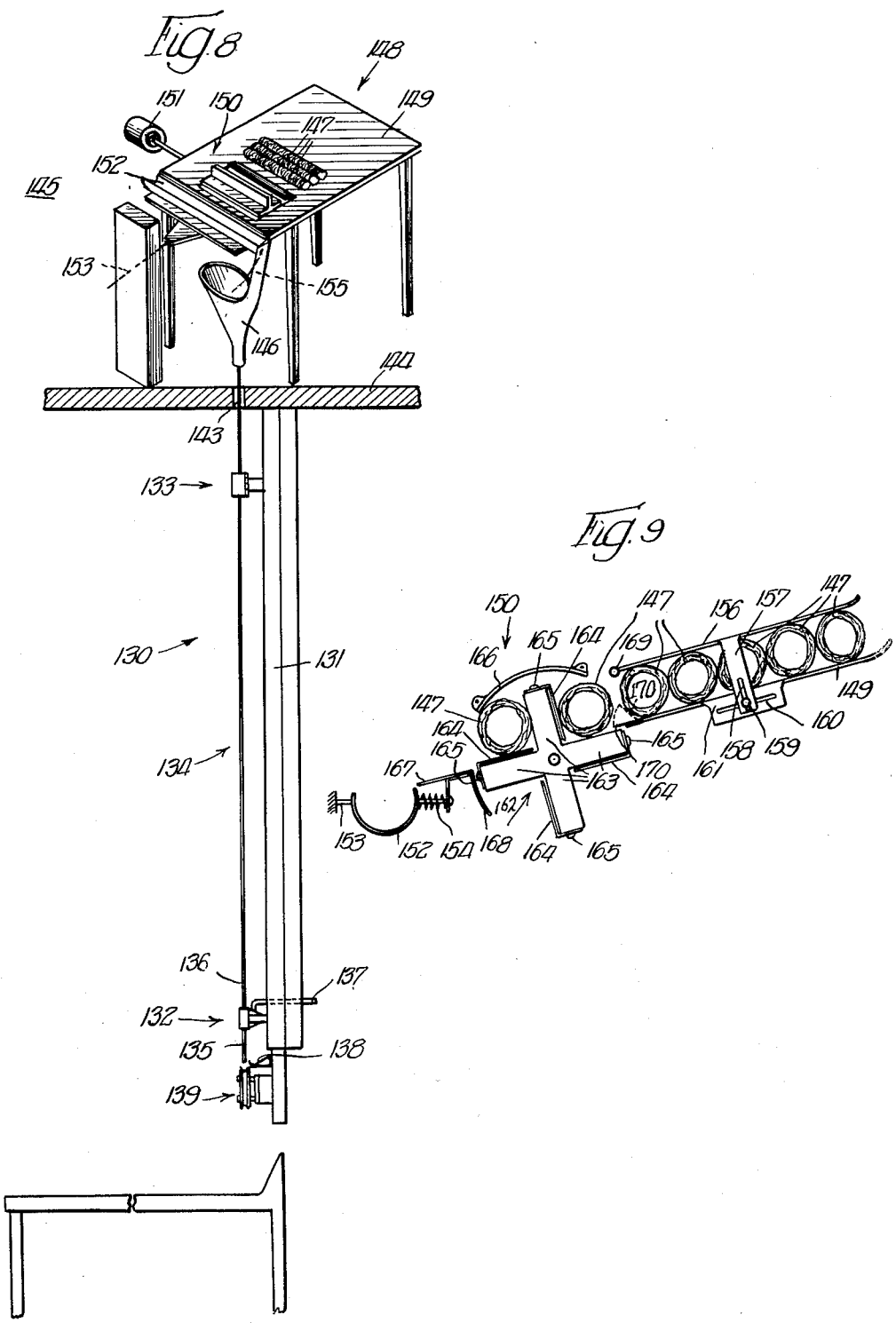

Sept. 29, 1964  H. G. WASHBURN  3,150,410
SAUSAGE STUFFING MACHINE
Filed Jan. 5, 1962  11 Sheets-Sheet 6

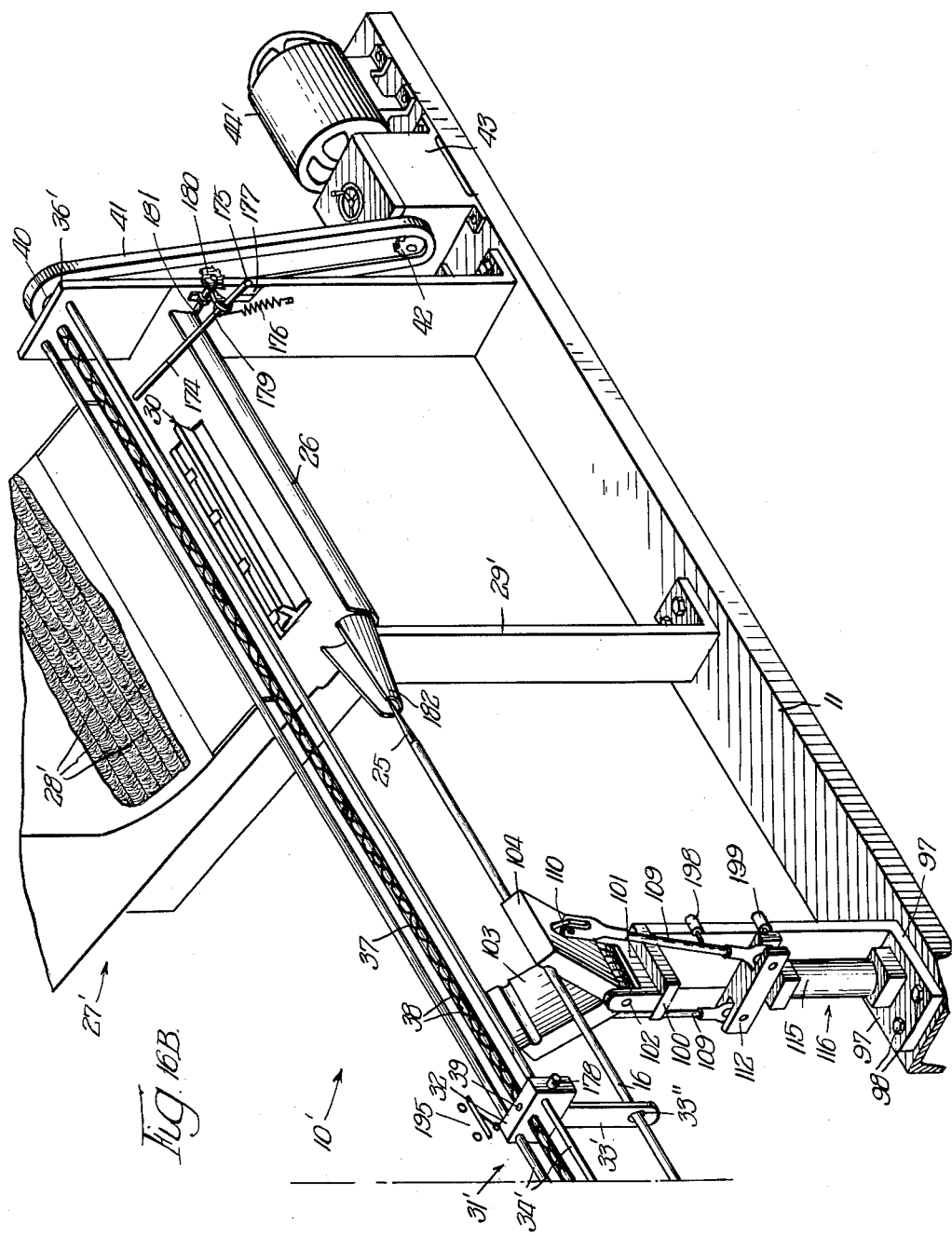

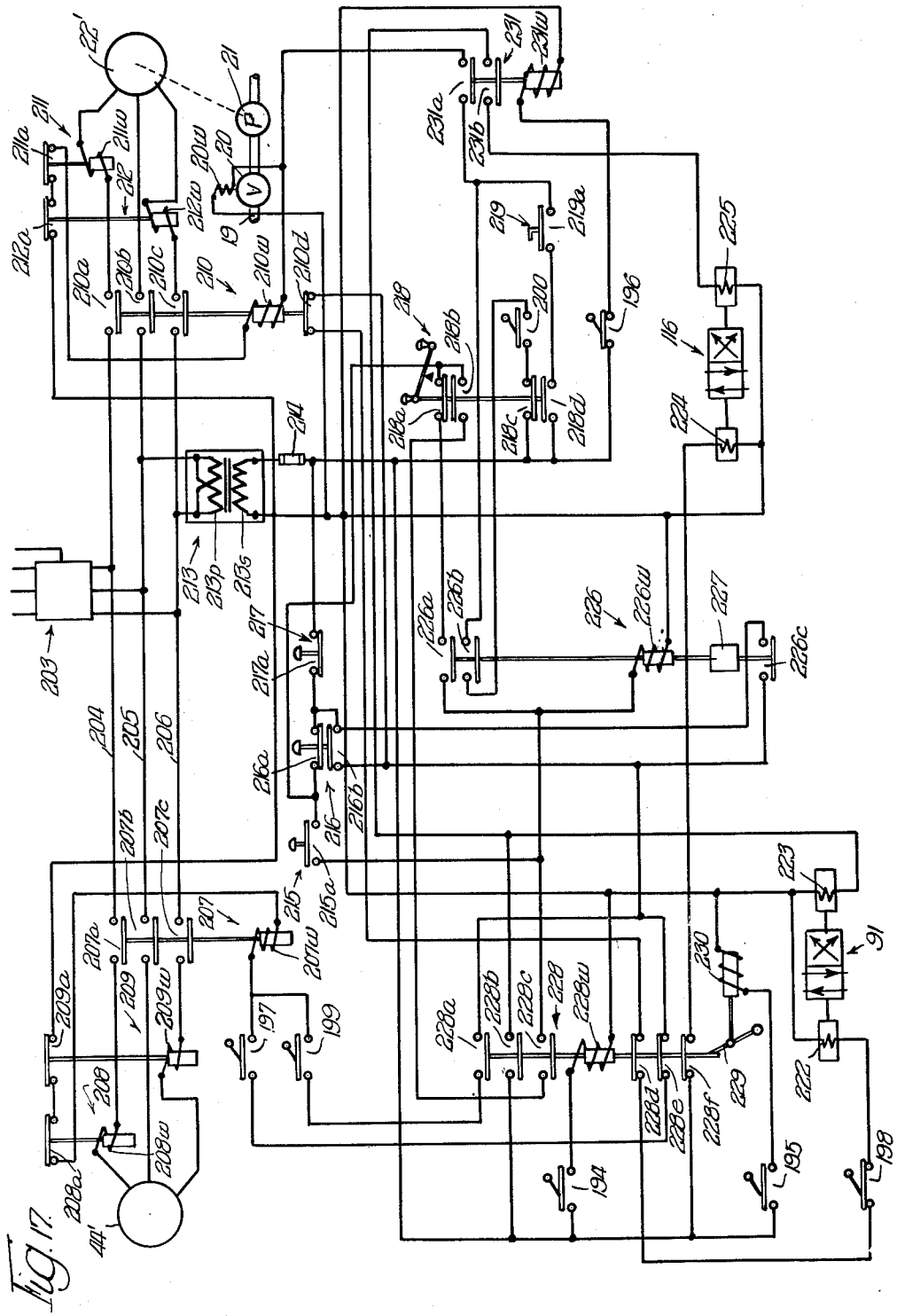

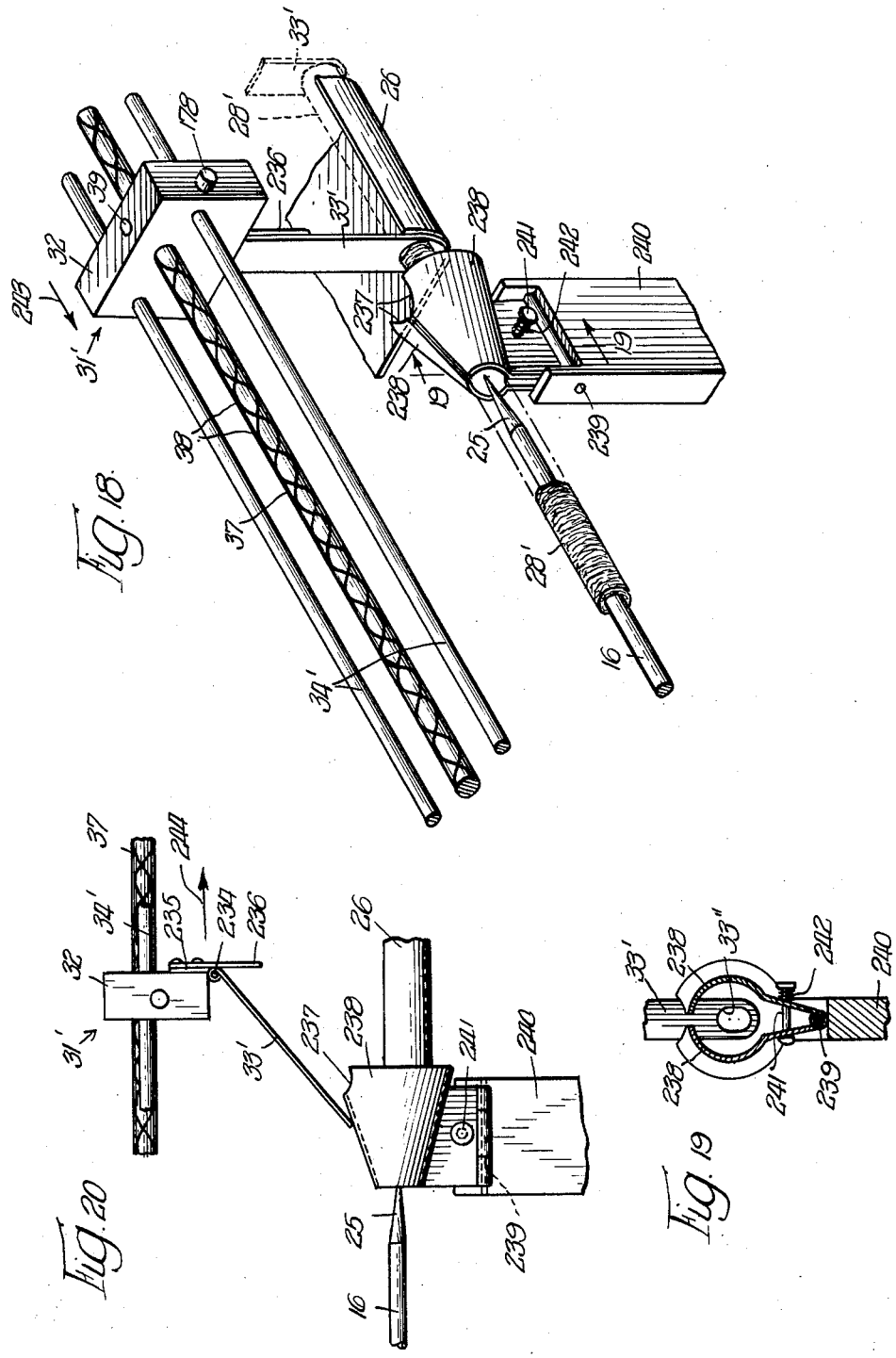

Sept. 29, 1964  H. G. WASHBURN  3,150,410
SAUSAGE STUFFING MACHINE
Filed Jan. 5, 1962  11 Sheets-Sheet 10
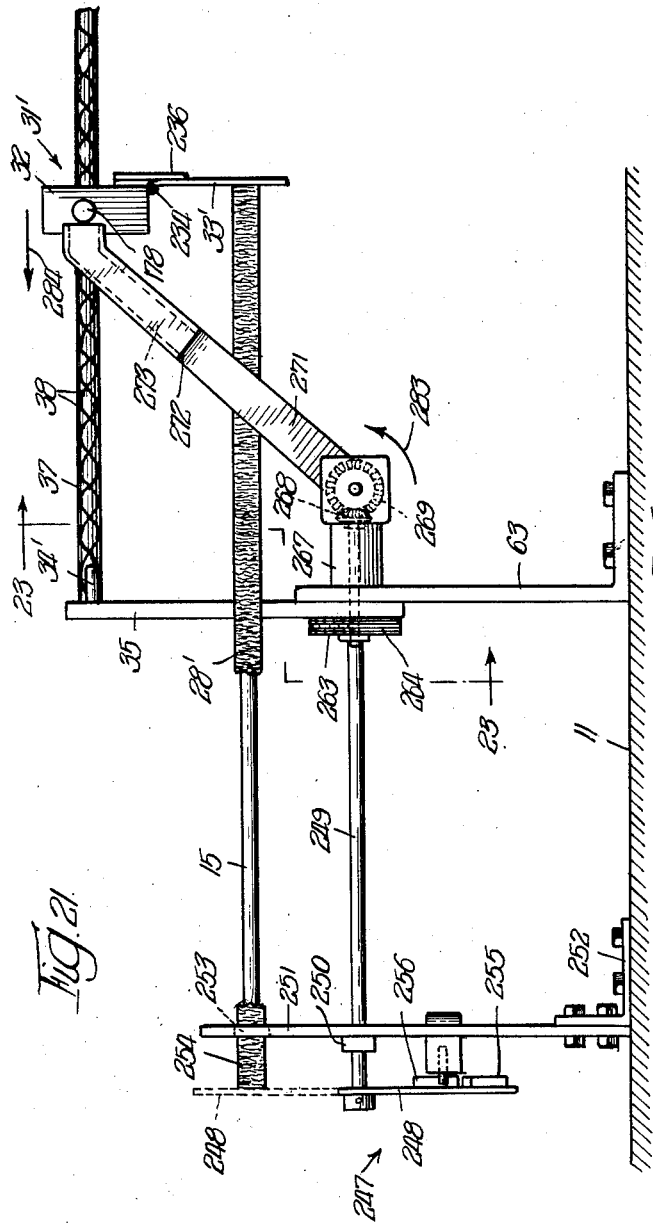
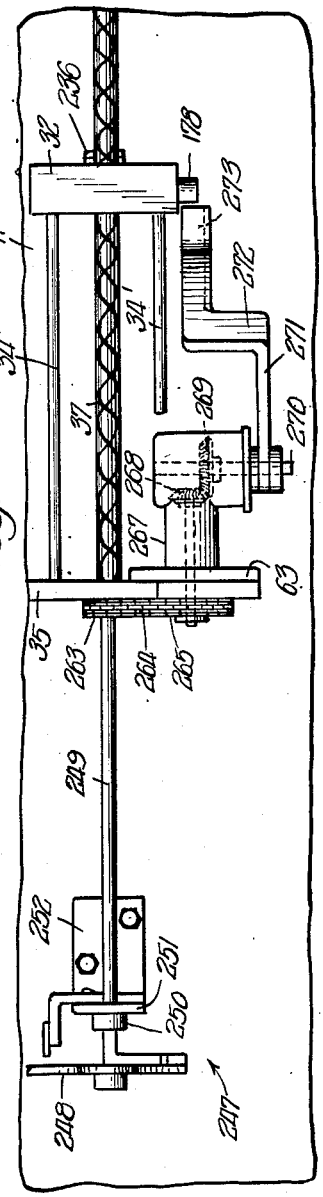

Sept. 29, 1964 H. G. WASHBURN 3,150,410
SAUSAGE STUFFING MACHINE
Filed Jan. 5, 1962 11 Sheets-Sheet 11
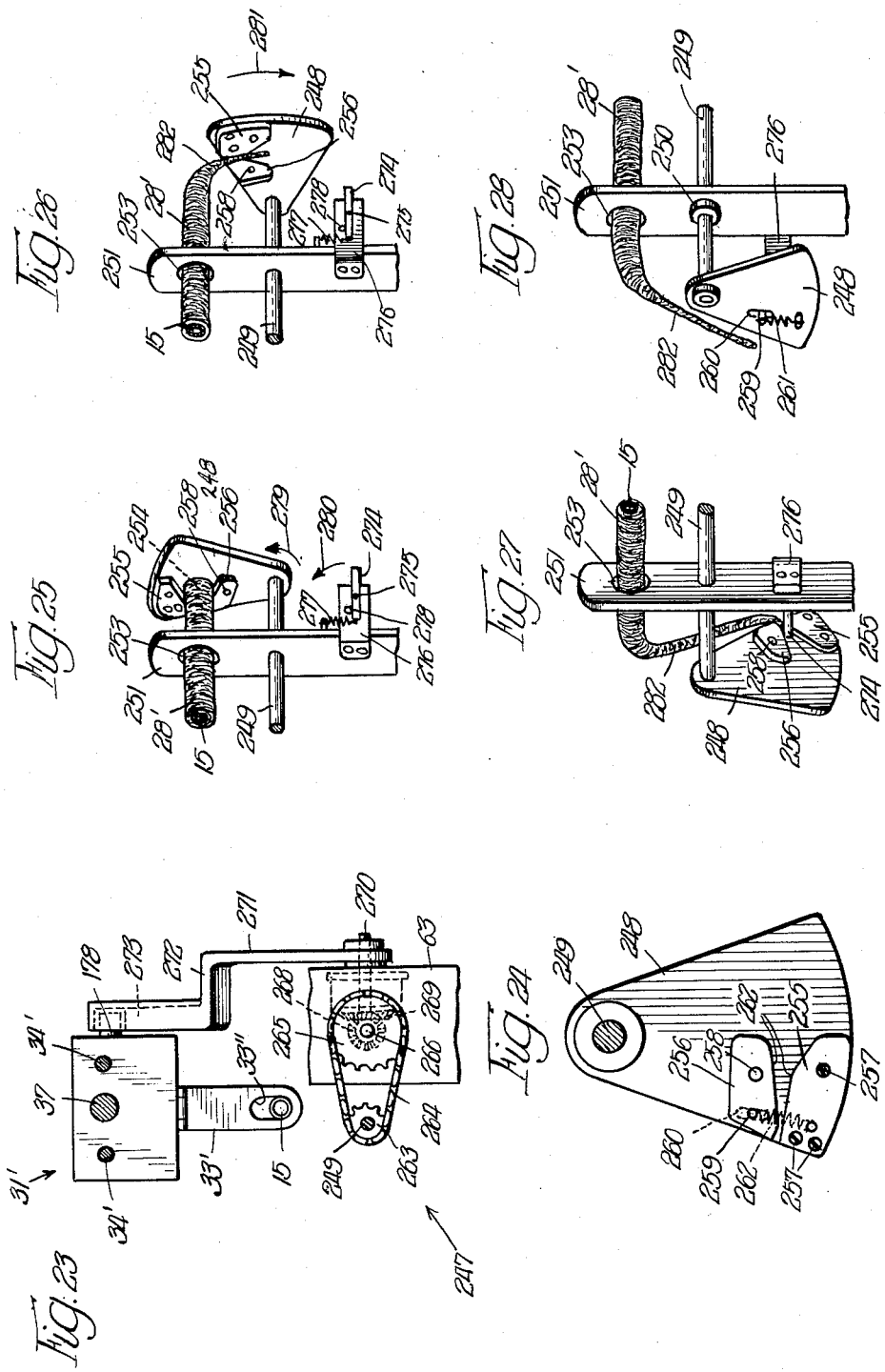

3,150,410
     SAUSAGE STUFFING MACHINE
Harry G. Washburn, Danville, Ill., assignor to Tee-Pak,
   Inc., Chicago, Ill., a corporation of Illinois
       Filed Jan. 5, 1962, Ser. No. 164,489
            11 Claims. (Cl. 17—35)

This invention relates, generally, to the stuffing of sausage casings and it has particular relation to apparatus and methods for stuffing shirred sausage casings which have been shirred by any suitable shirring machine such as that disclosed in U.S. Patent No. 2,722,714, issued November 8, 1955.

Among the objects of this invention are: To move a shirred sausage casing endwise toward a stuffing position and to stuff it with sausage emulsion in the same direction that the casing was moved to the stuffing position; to move another shirred casing toward the stuffing position while the first shirred casing is being stuffed; to provide an elongated sausage casing receiving member having a stuffing horn at one end and a transfer section at the other end arranged to receive a shirred casing endwise while a casing on the stuffing horn is being stuffed; to hold the elongated sausage casing receiving member against movement and to move a shirred casing therealong from the transfer section to the stuffing horn; to hold the elongated sausage casing receiving member against movement intermediate the ends of the transfer section while a shirred casing is being moved to the stuffing horn; to hold the elongated sausage casing receiving member against movement at the junction between the stuffing horn and the transfer section and to move a shirred casing onto and along the transfer section; to feed sausage emulsion into the stuffing horn through emulsion clamp means that holds the elongated sausage casing receiving member against movement at the junction between the stuffing horn and the transfer section; to employ transfer clamp means for engaging the transfer section intermediate its ends to hold the elongated sausage casing receiving member against movement; to operate sequentially the emulsion clamp means and the transfer clamp means to hold the elongated sausage casing receiving member against movement; to interlock the controls for the clamp means in such manner that the elongated sausage casing receiving member is always held against movement by either the emulsion clamp means or the transfer clamp means; to position the elongated sausage casing receiving member for horizontal operation; to position the elongated sausage casing receiving member for vertical operation; and to provide for unshirring a short length of the shirred casing over the distal end of the stuffing horn and to draw this part of the casing at right angles to the stuffing horn in order to facilitate starting of the stuffing operation.

Other objects of this invention will, in part, be obvious and in part appear hereinafter.

While the present invention is described as employing sausages casing of cellulosic material, it will be understood that other casing materials can be used. For example, natural casings, protein (hide fleshing and collagen) casings, alginate casings, starch casings, fibrous casings (cellulosic casings reinforced with cellulosic fibers) and the like can be arranged to be stuffed with sausage emulsion or other food or non-food product.

As just pointed out, the casings can be stuffed with other materials than sausage emulsion. Such materials include dairy products, for example processed cheese and butter. Egg products, including egg salad, can be employed for stuffing material. Also some candy, fish and meat products, such as spreads or hamburger, can be packaged as described herein. Some non-food products of the nature of putty, caulking compound, grease, lipstick and tobacco (snuff) can be stuffed into flexible casings by employing the present invention.

In the drawings:

FIG. 2 illustrates diagrammatically the electric circuit connections that can be employed in conjunction with the apparatus shown in FIG. 1.

FIG. 3 is a vertical elevational view of the emulsion clamp in the closed position.

FIG. 4 is a view of the emulsion clamp in the open position.

FIG. 5 is a vertical elevational view of the transfer clamp in the closed position.

FIG. 6 is a view of the transfer clamp in the open position.

FIG. 7 is a view, partly in elevation and partly in section, showing the details of construction of the elongated sausage casing receiving member having a stuffing horn at one end and a transfer section at the other end.

FIG. 8 is a view, showing another embodiment of the invention, in which the elongated sausage casing receiving member is vertically positioned rather than horizontally positioned as shown in FIG. 1.

FIG. 9 is a view, somewhat diagrammatic in character, showing the arrangement for feeding the shirred casings to the upper end of the elongated sausage casing receiving member shown in FIG. 8.

FIGS. 10 to 15 inclusive show diagrammatically the movement of a shirred casing onto the upper end of the elongated sausage casing receiving member shown in FIG. 8 to the stuffing position and being stuffed.

Figure 1:
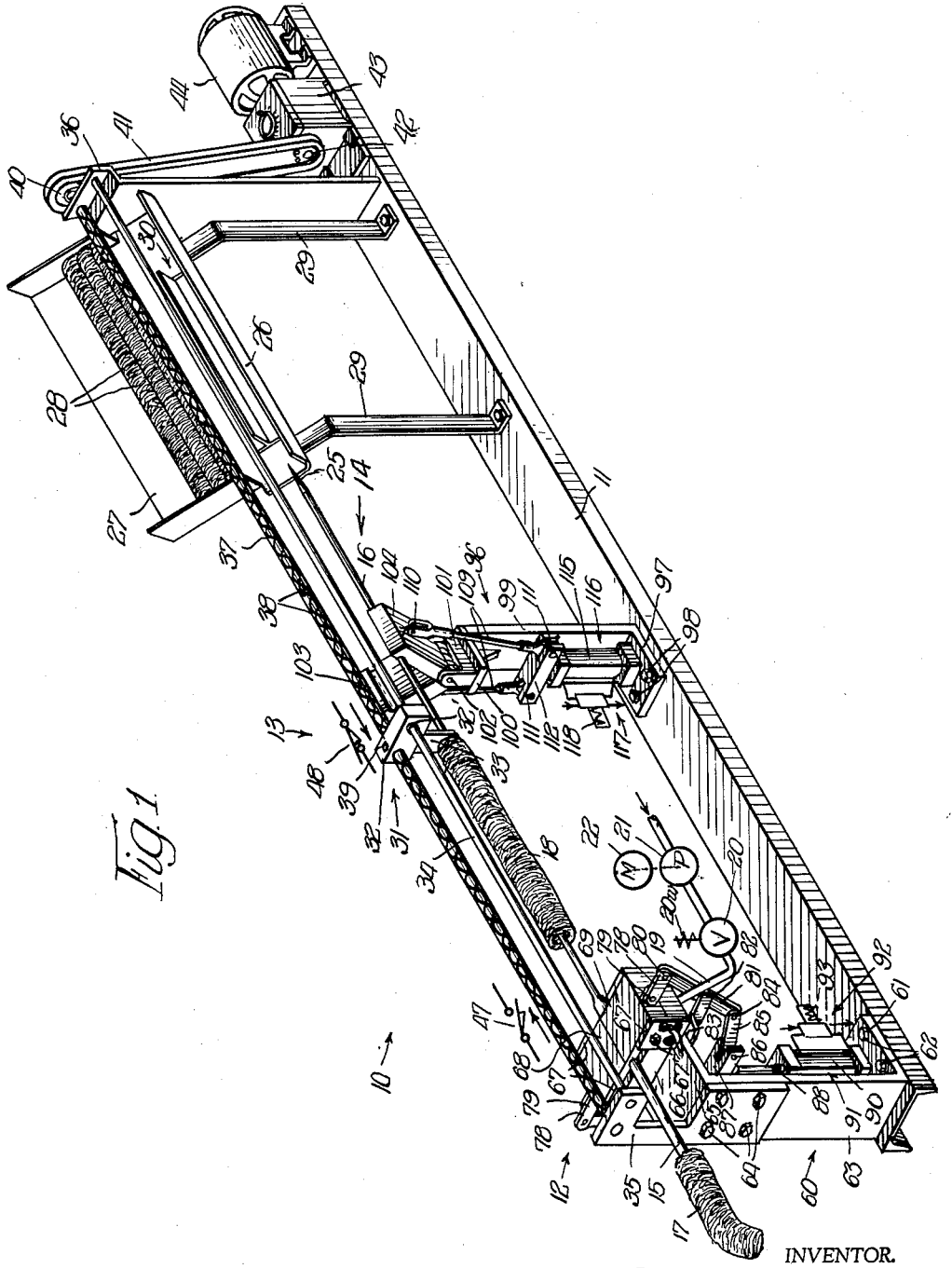
FIG. 1 is a perspective view of shirred sausage casing stuffing means and casing feeding means therefor embodying the present invention.
Figure 16A:
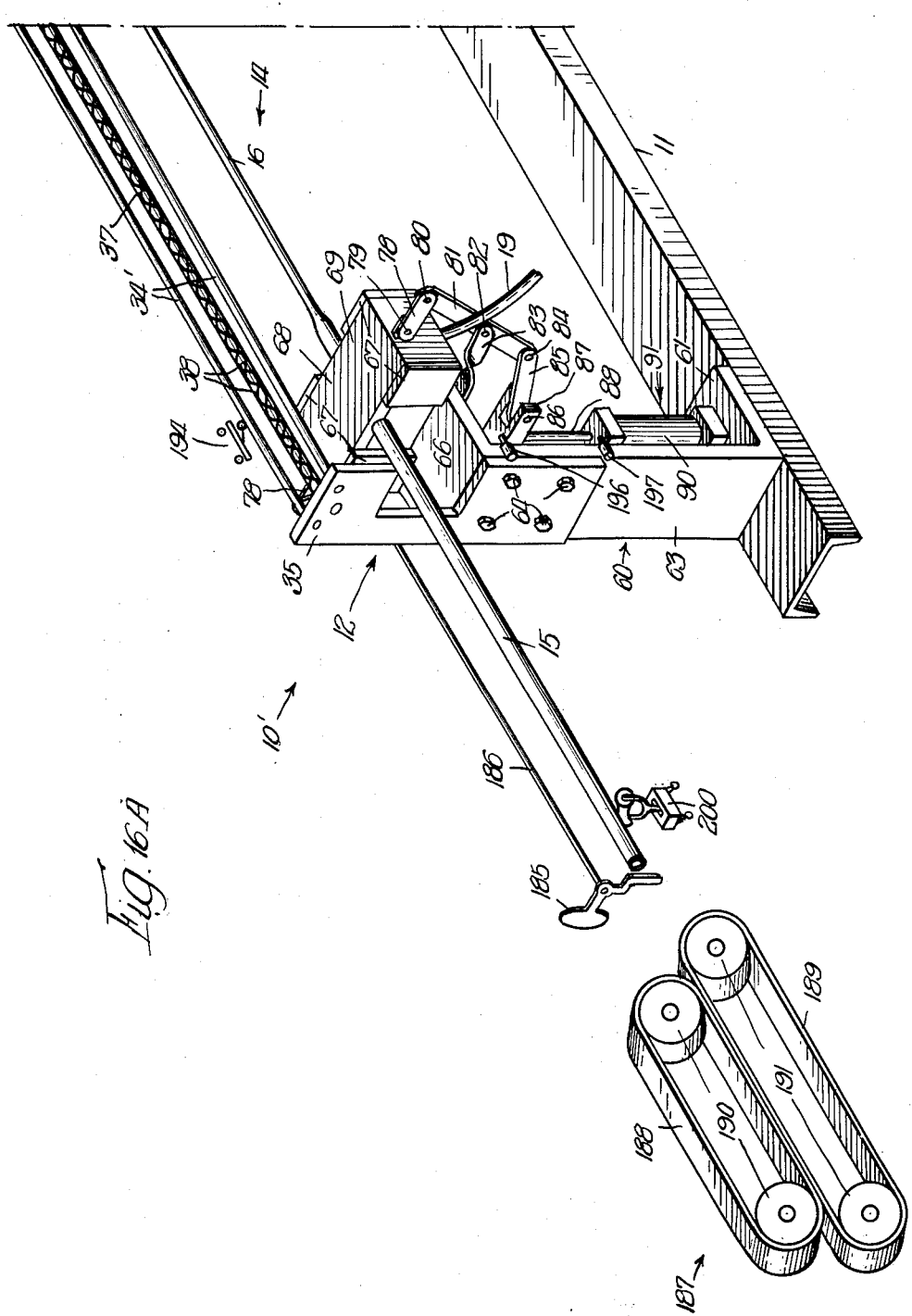

FIG. 16 is a view, similar to FIG. 1, and showing another embodiment of the invention. Because of its size, FIG. 16 is presented on two separate sheets of drawings designated FIG. 16A and FIG. 16B respectively.

FIG. 17 illustrates diagrammatically the circuit connections that can be employed in conjunction with the apparatus shown in FIG. 16.

FIG. 18 is a perspective view of a modified construction for the transfer dog and for the guide cone from that shown in FIG. 16.

FIG. 19 is a vertical sectional view taken generally along the line 19—19 of FIG. 18.

FIG. 20 is a view, in side elevation, of the construction shown in FIG. 18 which shows how the depending stem of the transfer dog slides over the sections of the guide cone on retraction.

FIG. 21 is a view, in side elevation, of the end of the machine, shown in FIG. 16, where the stuffing operation takes place and shows in more detail the construction and operation of the tabber.

FIG. 22 is a top plan view of the construction shown in FIG. 21, the stuffing horn being omitted.

FIG. 23 is a vertical sectional view taken generally along the line 23—23 of FIG. 21.

FIG. 24 is a vertical elevational view of the sector shaped plate that forms a part of the tabber means, the view being taken looking from right to left in FIG. 21, and on a slightly enlarged scale.

FIGS. 25, 26, 27 and 28 are perspective views showing different positions of the sector shaped plate forming a part of the tabber means to illustrate how an end portion of a shirred casing is unshirred and moved at right angles to the distal end of the stuffing horn in order to permit the start of the stuffing operation.

Referring now particularly to FIG. 1 of the drawings, it will be observed that the reference character 10 designates, generally, a horizontal machine for stuffing shirred sausage casings. The machine 10 includes a channel base 11 carrying at one end an emulsion clamp assembly that is indicated generally at 12 and intermediate its ends a transfer clamp assembly that is indicated, generally, at 13. The clamp assemblies 12 and 13 are arranged to hold against movement a horizontal elongated sausage casing receiving member, shown generally at 14 and illustrated in more detail in FIG. 7 of the drawings. The elongated sausage casing receiving member 14 includes at one end a stuffing horn 15 and at the other end a transfer section 16 both preferably formed of polished stainless steel. In the operation of the machine 10 a shirred casing 17 is moved onto the stuffing horn 15 from the transfer section 16 in a manner to be described while another shirred casing 18 is moved onto the part of the transfer section 16 for subsequent movement onto the stuffing horn 15. The shirred casing 17 on the stuffing horn 15 is arranged to be stuffed with a suitable sausage emulsion that flows through an emulsion conduit 19 into a part of the emulsion clamp assembly 12 to be described. For controlling the flow of the emulsion through the conduit 19 an emulsion valve 20 is provided that is arranged to be operated by an emulsion valve operating winding 20w. The emulsion is caused to flow through the emulsion conduit 19 from a suitable emulsion supply by a controllable pump means comprising emulsion pump 21 that is driven by an emulsion pump motor 22.

At the distal end of the transfer section 16 of the elongated sausage casing receiving member 14 is a tip 25 that is formed of suitable non-abrasive material such as nylon. The tip 25 is in alignment with a curved bottom 26 of an inclined hopper 27 on which a suitable supply of shirred casings 28 is positioned. The hopper 27 is mounted on supports 29—29 which are carried by the channel base 11. A suitable indexing means, shown generally at 30, is provided for feeding the shirred casings 28 in the hopper 27 one by one onto the surface of the curved bottom 26 and into alignment with the tip 25 for transfer thereto in a manner to be described.

The shirred casings 28 are moved one by one from the curved bottom 26 of the inclined hopper 27 by a transfer dog that is indicated generally, at 31. It will be observed that the transfer dog 31 is generally T-shaped and that it has a head 32 with a depending stem 33. The depending stem 33 is arranged to engage one end of a shirred casing, for example as indicated in engagement with one end of the shirred casing 18, for the purpose of moving it over the tip 25 onto the transfer section 16 and therefrom onto the stuffing horn 15 of the elongated sausage casing receiving member 14. Provision is made for reciprocating the transfer dog 31 from one end to the other of the machine 10. For this purpose a guide rod 34 is provided. The head 32 carries a suitable bushing 32' for slidable mounting on the horizontally extending guide rod 34 which is stationarily mounted at one end in a bracket 35 that is carried by the emulsion clamp assembly 12 and at the other end on a bracket 36 which is mounted directly on the channel base 11. Rotatably mounted at its ends in the brackets 35 and 36 is an operating shaft 37 which is provided with a double spiral groove 38 with which a pawl 39 in the head 32 of the transfer dog 31 engages. It will be understood that on rotation of the operating shaft 37 in one direction, the transfer dog 31 is caused to move from one end of the guide rod 34 to the other and then to reverse this movement as the result of the interaction between the double spiral groove 38 and the pawl 39. At each end of the guide rod 34 the motion of the transfer dog 31 is reversed. For rotating the shaft 37 a sprocket 40 is secured thereto and over it drive belt means 41 is trained. Drive belt means 41 also is trained over a sprocket 42 which is driven through a gear reducer 43 by a transfer dog motor 44. While FIG. 2 shows the transfer dog motor 44 as being a single phase motor, it will be understood that, if desired, it can be a three phase motor with suitable provision being made for connecting it for energization to a three phase alternating current source.

The operation of the emulsion clamp assembly 12 and the transfer clamp assembly 13 is controlled, in part, by limit switches 47 and 48. It will be noted that the limit switch 47 is normally open and that it is located adjacent the emulsion clamp assembly 12. The arrangement is such that the limit switch 47 is closed momentarily by the transfer dog 31 on the return stroke thereof from moving the shirred casing 17 onto the stuffing horn 15 and at a location just past the emulsion clamp assembly 12. The limit switch 48 is normally closed and is arranged to be opened momentarily by the transfer dog 31 on its forward stroke in moving the shirred casing 18 to the position shown in FIG. 1 of the drawings. The limit switch 48 is positioned to be operated by the transfer dog 31 just after it has passed the transfer clamp assembly 13 during its forward stroke.

Referring now particularly to FIG. 7 of the drawings, it will be observed that the stuffing horn 15 has an opening 49 extending therethrough to a discharge opening 50 at its distal end out of which the sausage emulsion is caused to flow to stuff the casing 17 mounted thereon. At its other end the stuffing horn 15 has a transverse port 51 to permit the flow of sausage emulsion transversely of the stuffing horn 15 and into its longitudinal opening 49 therethrough. An intermediate fitting 52 serves to interconnect the stuffing horn 15 and the transfer section 16. It will be observed that one end 53 of the intermediate fitting 52 is telescoped into the juxtaposed end of the stuffing horn 15. An inclined grooved surface 54 is located at one end of the intermediate fitting 52 in alignment with the transverse port 51 to direct the flow of sausage emulsion into the longitudinal opening 49. The other end 55 of the intermediate fitting 52 is telescoped over a reduced end portion 56 of the transfer section 16. It will be observed that the external diameter of the transfer section 16 is substantially less than the external diameter of the stuffing horn 15 and that the external surface of the end 55 of the intermediate fitting 52 is generally conically shaped in order to interconnect these surfaces of different diameters. The reason for this construction is to facilitate the movement of the shirred casings along the transfer section 16 with a minimum of frictional resistance while ultimately expanding them to the diameter necessary to telescope over the stuffing horn 15. A stud portion 57 from the tip 25 interfits with the juxtaposed tapered end of the transfer section 16 for mounting the tip 25 endwise thereof.

The details of construction of the emulsion clamp assembly 12 will now be described with particular reference to FIGS. 1, 3 and 4 of the drawings. It will be observed that this assembly includes a channel shaped support 60 which has a base flange 61 that is secured by bolts 62 to the channel base 11. The support 60 has a central portion 63 to which the bracket 35 is secured by bolts 64. A top flange 65 forms a part of the support 60 and it carries a base 66 that is suitably secured thereto and is provided near its ends with upstanding guides 67, four in number, that are secured in position by bolts 67'. Slidably mounted on the upper side of the base 66 and between the guides 67 are clamps 68 and 69 which are arranged to engage and securely hold the stuffing horn 15 and thereby the elongated sausage casing receiving member 14 against any movement. For this purpose semicircular openings 70 and 71 are provided in the clamps 68 and 69 and the diameter of the opening therethrough, when closed, FIG. 3, is such as to securely clamp the stuffing horn 15 therebetween. In addition a centering pin 72 is provided at the base of the semicircular opening 70 in the clamp 68 for engagement with a recess 73, FIG. 7, in the elongated sausage casing receiving member 14 for the purpose of positively preventing any turning thereof about its longitudinal axis.

It will be recalled that the emulsion conduit 19 was described as supplying the sausage emulsion to the emulsion clamp assembly 12. For this purpose an angle shaped passageway 74 is provided in the clamp 69 and it interconnects the bottom of the semicircular opening 71 with a passageway 75 that extends through the base 66 and with which the conduit 19 directly communicates. When the stuffing horn 15 is in position on the emulsion clamp assembly 12 and the clamps 68 and 69 are closed, the emulsion conduit 19 has direct communication to the longitudinal opening 49 in the stuffing horn 15 through the transverse port 51 which, under these circumstances, is directly in front of the angle shaped passageway 74.

Referring now particularly to FIG. 4 of the drawings, it will be observed that, when the clamps 68 and 69 are in the open position, the passageway 74 no longer is in communication with the passageway 75. Thus, when the clamp 69 is in the open position, the passageway 75 is closed off so that a valve action is provided by this movement of the clamp 69 from its position shown in FIG. 3 to the open position shown in FIG. 4.

For operating the clamps 68 and 69 between the closed position shown in FIG. 3 and the open position shown in FIG. 4 links 78—78 are provided and are pivotally connected at 79—79 to the outer sides of the clamps 68 and 69. The links 78—78 are pivoted at 80—80 to upper ends of links 81—81 which are pivoted intermediate their ends at 82—82 to the ends of a connecting link 83. The lower ends of the links 81—81 are pivoted at 84—84 to links 85—85 which, in turn, are pivoted at 86—86 to the ends of a cross head 87. The cross head 87 is mounted on the upper end of a piston rod 88 having a piston 89, FIG. 2, at its lower end slidable in a cylinder 90 of a hydraulic operator that is shown generally at 91 and is mounted on the base flange 61 of the support 60. For controlling the operation of the hydraulic operator 91 a solenoid valve 92 is employed and it is controlled by a solenoid 93. On application of suitable hydraulic pressure to one end or the other end of the cylinder 90, the piston 89, piston rod 88 and cross head 87 are moved downwardly to open the clamps 68 and 69 or upwardly to close them as the case may be.

The details of construction and operation of the transfer clamp assembly 13 are shown in FIGS. 1, 5 and 6 of the drawings and now will be described. It will be observed that a channel shaped support 96 is employed having a base flange 97 that is secured by bolts 98 to the channel base 11. The support 96 has a central portion 99 and a top flange 100 which carries an upstanding bifurcated bracket 101 suitably secured thereto. A pivot pin 102 extends through the arms of the bracket 101 for pivotally mounting clamps 103 and 104 which have semicircular openings 105 and 106 therein which are of such dimension that, when the clamps 103 and 104 are closed as shown in FIGURE 5, the transfer section 16 is securely gripped therebetween. In addition a centering pin 107 is provided at the bottom of the semicircular opening 106 in the clamp 104 for interfitting with a recess 108, FIG. 7, in the transfer section 16 of the elongated sausage casing receiving member 14 to hold it positively against rotation about its longitudinal axis.

For moving the clamps 103 and 104 between the closed position shown in FIG. 5 and the open position shown in FIG. 6 adjustable links 109—109 are provided. They are pivoted at 110—110 to ears extending from the clamps 103 and 104. Also the links 109—109 are pivoted at their other ends at 111—111 to the ends of a cross head 112 which is carried by a piston rod 113, FIG. 2, having a piston 114 at its other end that is movable in a cylinder 115 which forms a part of a hydraulic operator 116 that is mounted on the base flange 97. A solenoid valve 117 operated by a solenoid 118 serves to control the flow of hydraulic fluid to opposite ends of the cylinder 115 for moving the cross head 112, piston rod 113 and piston 114 upwardly to close the clamps 103 and 104 or downwardly to open them as shown in FIG. 6.

FIG. 2 shows the circuit connections that can be employed for controlling the operation of the machine 10. Here it will be observed that conductors 121—121 are provided which can be energized from a suitable alternating current source, such as 110 volt 60 cycle source, although it will be understood that other electrical sources can be employed as may be desired. Line switches 122—122 serve to connect the conductors 121—121 to conductors 123—123 between which the various electrical devices are connected for energization.

In order to stop the operation of the machine 10, except for controlling the operation of the emulsion valve 20 and the emulsion pump 21, a stop switch shown generally at 124 is employed and it has normally closed contacts 124a. For starting the machine 10, except as noted, a start switch shown at 125 is used. It is provided with normally open contacts 125a and 125b. A clamp control relay, shown generally at 126, is employed for controlling the operation of the emulsion clamp assembly 12 and the transfer clamp assembly 13. It includes an operating winding 126w, normally open contacts 126a, 126b and 126d and normally closed contacts 126c. The limit switches 47 and 48 are arranged to control the operation of an auxiliary control relay that is indicated, generally, at 127. It includes an operating winding 127w, normally open contacts 127a, 127c, and 127d and normally closed contacts 127b. The transfer dog motor 44 is controlled by a transfer dog motor relay that is indicated, generally, at 128 and it includes a winding 128w, normally open contacts 128a and 128b and normall closed contact 128c. A foot switch shown generally at 129, having normally open contacts 129a is provided for controlling the energization of the emulsion valve operating winding 20w and the energization of the emulsion pump motor 22.

In describing the operation of the machine 10 employing the circuit connections shown in FIG. 2 it will be assumed that the shirred casing 17 is positioned on the stuffing horn 15, that the transfer clamps 103 and 104 are open, that the transfer dog 31 is in the position shown in FIG. 1 where it has moved the shirred casing 18 onto the transfer section 16 adjacent the emulsion clamps 68 and 69 which are closed, that relays 126, 127 and 128 are deenergized and that the line switches 121—121 are closed to energize conductors 123—123. The operator closes contacts 129a of foot switch 129 and as a result obvious energizing circuits are completed for the emulsion valve operating winding 20w and the emulsion pump motor 22. The emulsion is fed through the emulsion conduit 19 and into the stuffing horn 15 to stuff the shirred casing 17. On completion of this stuffing operation, the operator opens the foot switch 129 to deenergize the emulsion valve operating winding 20w and the emulsion pump motor 22. The flow of sausage emulsion through the conduit 19 then ceases. It will be observed that the foregoing energizing circuit for the emulsion valve operating winding 20w and the emulsion pump motor 22 is completed through normally closed contacts 128c of the transfer dog motor relay 128 which, under the assumed operating conditions, is deenergized.

Next the operator depresses the start switch 125 to complete an energizing circuit at contacts 125b through normally closed contacts 127b for energizing the operating winding 126w of the clamp control relay 126. One result of the energization of the relay 126 is to open contacts 126c and deenergize the solenoid 118 of the solenoid valve 117 which controls the hydraulic operator 116. As a result the piston 114 in the cylinder 115 is moved upwardly to close the transfer clamps 103 and 104 onto the horizontally extending transfer section 16 of the elongated sausage casing receiving member 14 to hold it against movement. Also as a result of energization of the clamp control relay 126 contacts 126d are closed to complete an energizing circuit for the solenoid 93 of the solenoid valve 92 with the result that the piston 89 in the cylinder 90 is moved downwardly to open the emulsion clamps 68 and 69. A further result of the operation of the clamp control relay 126 is to close contacts 126b and complete a sealing circuit around the contacts 125b of the start switch 126 which can be released without interfering with the continued energization of the clamp control relay 126.

A further result of the operation of the clamp control relay 126 is to close contacts 126a which occurs before the release of the start switch 125 to complete an energizing circuit for operating winding 128w of the transfer dog motor relay 128. This circuit can be traced from energized conductor 123 through normally closed contacts 124a of the stop switch 124, contacts 125a of start switch 125, contacts 126a of clamp control relay 126 and operating winding 128w of transfer dog motor relay 128 to the other energized conductor 123. At contacts 128a a sealing circuit is provided for the operating winding 128w of the transfer dog motor relay 128.

As a result of the operation of the transfer dog motor relay 128 its contacts 128b are closed to energize the transfer dog motor 44 and a further result is to open contacts 128c to prevent the energization of the emulsion valve operating winding 20w and the emulsion pump motor 22 as long as the transfer dog motor relay 128 is energized and the auxiliary control relay 127 remains deenergized.

As a result of the energization of the transfer dog motor 44, the operating shaft 37 is rotated to move the transfer dog 31 forwardly and shift the shirred casing 18 past the open emulsion clamps 68 and 69 onto the stuffing horn 15. At the end of its forward stroke the pawl 39 in the head 32 of the transfer dog 31 cooperates with the double spiral groove 38 in the operating shaft 37 in such manner as to reverse the movement of the transfer dog 31 so that it operates backward past the open emulsion clamps 68 and 69 where it engages limit switch 47 momentarily to close it. As a result of the momentary closure of limit switch 47 an energizing circuit through closed limit switch 48 is completed for the operating winding 127w of the auxiliary relay 127 and it is energized. At its contacts 127c a sealing circuit for the operating winding 127w is completed around the contacts of the limit switch 47. Also at contacts 127a a circuit is completed to maintain the operating winding 128w of the transfer dog motor relay 128 energized on subsequent opening of contacts 126a of the clamp control relay 126. At contacts 127b the energizing circuit for the operating winding 126w is opened and the clamp control relay 126 is deenergized.

As a result of the deenergization of the clamp control relay 126, contacts 126d are opened to deenergize the solenoid 123 and effect closure of the emulsion clamps 68 and 69. At contacts 126c the energizing circuit for the solenoid 118 is completed to open the transfer clamps 103 and 104. Contacts 127d are closed on energization of the auxiliary control relay 127 to permit the operator to energize the emulsion valve operating winding 20w and the emulsion pump motor 22 for the purpose of stuffing the shirred casing 18 now on the stuffing horn 15 while the transfer dog 31 continues to be retracted by continued operation of the transfer dog motor 42 to move along the guide rod 34 past the open transfer clamps 103 and 104 and into the hopper 27 at the right end of its curved bottom 26. Here the indexing means 30 is operated to place the next shirred casing 28 in the hopper 27 along the curved bottom 26 and in the path of the depending stem 33 of the transfer dog 31. When the transfer dog 31 has been moved to the right end of the operating shaft 37, the pawl 39 in the head 32 cooperates with the double spiral groove 38 to reverse the movement of the transfer dog 31 so that again it moves forwardly to move the next shirred strand 28 along the curved bottom 26 and onto the tip 25 of the elongated sausage casing receiving member 14. The forward movement of the transfer dog 31 continues until it has moved the next shirred strand 20 the position shown in FIG. 1 occupied by the shirred strand 18. Here the transfer dog 31 has moved slightly past the open transfer clamps 103 and 104 and has momentarily opened the contacts of the limit switch 48. This deenergizes the operating winding 127w of the auxiliary control relay 127 and its contacts 127a the holding circuit for the operating winding 128w of the transfer dog motor relay 128 is opened to open its contacts 128b and deenergize the transfer dog motor 44. Further forward motion of the transfer dog 31 ceases. At contacts 128c a circuit is completed in parallel with the contacts 127d of the auxiliary control relay 127 to permit continued energization of the emulsion valve winding 20w and of the emulsion pump motor 22 so that the stuffing operation can continue until completion.

FIGS. 8 to 15 inclusive show another embodiment of the invention. Here it will be observed that the reference character 130 designates, generally, a vertical machine for stuffing shirred sausage casings in which the force of gravity is employed for shifting the shirred casings to the stuffing position. In this embodiment of the invention it is unnecessary to employ means corresponding to the transfer dog 31 and the operating means therefor described above.

The machine 130 includes a vertical support 131 which may be a vertical column or a vertical wall on which an emulsion clamp assembly, shown generally at 132, is mounted. Well above the emulsion clamp assembly 132 is a transfer clamp assembly that is indicated, generally, at 133 and is mounted on the vertical support 131. It will be understood that the emulsion clamp assembly 132 and the transfer clamp assembly 133 are essentially the same in construction as the emulsion clamp assembly 12 and the transfer clamp assembly 13 described above. Accordingly, a description of them will not be repeated.

Held against movement by the clamp assemblies 132 and 133 is a vertical elongated sausage casing receiving member, shown generally at 134, which corresponds to the horizontal elongated sausage casing receiving member described hereinbefore and it has a stuffing horn 135 at its lower end and a transfer section 136 at its upper end, the latter being substantially longer than the transfer section 16 described hereinbefore. It will be understood that the clamp assemblies 132 and 133 are sequentially operated in such manner as to hold the vertical elongated sausage casing receiving member 134 against any movement. As before, the sausage emulsion is fed to the emulsion clamp assembly 132 from a source thereof by a pump and through a valve and finally through an emulsion conduit 137 which corresponds to the emulsion conduit 19 previously described. At the distal end of the stuffing horn 135 there is mounted a casing stop and tabber 138 in conjunction with a sizer 139, the former being employed for causing one end of the shirred casing to close off the open end of the stuffing horn 135 to permit the casing to be filled with the sausage emulsion and the latter being employed for making uniform the size of the stuffed product.

It will be observed that the upper end of the transfer section 136 extends through an opening 143 in a floor 144 above which is a space 145 the atmosphere of which can be controlled so as to maintain proper temperature and humidity conditions for the shirred casings at a location unaffected by the atmosphere where the stuffing of the casings is accomplished. This arrangement makes it possible to store the shirred casings under conditions that are most suitable for their preservation and they are exposed to the atmosphere of the stuffing area before being stuffed for such limited time that they are substantially unaffected thereby. It will be understood that the controlled space 145 may be located on the floor 144 immediately above the stuffing area or it may be located at a higher level as may be desired.

The upper end of the transfer section 136 extends into the lower end of a funnel 146 into which shirred casings 147 are arranged to be positioned one by one. The shirred casings 147 are placed in a hopper, shown generally at 148, having an inclined floor 149 at the lower portion of which indexing means, shown generally at 150, are provided. An index drive motor 151 is arranged to operate the indexing means 150. For illustrative purposes it is pointed out that the index drive motor 151 can be substituted for the transfer dog motor 44 in the control system shown in FIG. 2 with the system being otherwise the same and operating in the sequence previously described.

The shirred casing 147 from the indexing means 150 moves into a trough 152 that is rotatable about a horizontal axis 153 and is biased to the horizontal position by a spring 154. It will be understood that the arrangement is such that when a shirred casing 147 is moved into the trough 152, its weight is sufficient to overcome the biasing action of the spring 154 and the trough 152 rotates about the axis 153 as indicated by the broken line 155 to a position within the upper portion of the funnel 146 to such an angle that it slides by gravity from the trough 152 into the funnel 146 with the lower portion of the latter centering it and guiding in onto the upper end of the transfer section 136. After the shirred casing 147 has slid off the trough 152, the latter swings back to the horizontal position under the influence of the spring 154.

Referring particularly to FIG. 9 of the drawings, it will be observed that the hopper 148 includes a top plate 156 which extends generally parallel to the inclined floor 149 and is supported by arms one of which is shown at 157. The top plate 156 is adjustable to accommodate different diameters of shirred casings 147 and for this purpose the arm 157 is provided with a longitudinal slot 158 for receiving an adjusting screw 159 which extends through a slot 160 extending lengthwise of a bracket 161 that is mounted on the under side of the inclined floor 149. It will be understood that the spacing of the top plate 156 from the floor 149 can be varied by loosening the adjusting screw 159, then repositioning the top plate 156, and again tightening the screw 159.

The indexing means 150, as shown in FIG. 9, includes a rotor 162 having four arms 163 each of which is provided with a roll off plate 164 that is adjustable thereon by a screw 165. Adjustment of these roll off plates 164 is required in order to accommodate different diameters of shirred casings 147. In order to retain the shirred casings 147 in position on the respective arms 163 of the rotor 162 a barrel baffle 166 overlies the upper portion thereof as shown. The shirred casings 147 are moved one by one by the rotor 162 from the hopper 148 onto an inclined plate 167 which directs each shirred casing 147 into the trough 152. An extension 168 of the barrel baffle projects downwardly from the upper edge of the inclined plate 167 to assist in guiding the shirred casing onto the inclined plate 167. In order to insure that only one of the shirred casings 147 is picked up by one of the arms 163, a roller 169 is mounted at the lower end of the top plate 156 with the adjustment being such as to engage lightly the upper portion of the next casing so as to prevent its movement off the lower edge of the floor 149. The roller 169 operates in conjunction with a flexible rubber baffle 170 that extends along the lower edge of the inclined floor 149 and is arranged to be lifted by the next arm 163 to prevent the succeeding shirred casing from interfering with the rotation of the rotor 162.

FIGS. 10 to 15 inclusive show the sequence of operations for the machine 130 employing the control system shown in FIG. 2 with the index drive motor 151 substituted for the transfer dog motor 44 and with the provision being made for operating the limit switches 47 and 48 in proper sequence to operate the clamps 132 and 133. FIG. 10 shows a shirred casing 147 having been fed by the indexing means 150 to the trough 152. In this figure the emulsion clamps 132 are closed while the transfer clamps 133 are opened. In FIG. 11 the trough 152 has swung from the horizontal to the vertical position and the shirred casing 147 has been discharged into the funnel 146 and has moved downwardly along the upper end of the transfer section 136 to a position adjacent the transfer clamps 133 which now are closed while the emulsion clamps 132 are open. FIG. 12 shows the trough 152 again swung to the horizontal position with a shirred casing 147 received thereby. This figure also shows the transfer clamps 133 open permitting the shirred casing 147 to slide downwardly to a position adjacent the emulsion clamps 132 which are closed. FIG. 13 shows another shirred casing 147 moving downwardly along the transfer section 136 to a position adjacent the closed transfer clamps 133 while the emulsion clamps 132 have been opened to permit the shirred casing 147 to slide onto the stuffing horn 135. FIG. 14 shows still another shirred casing 147 on the trough 152 while the immediately previously fed shirred casing 147 has moved downwardly to the closed emulsion clamps 132 since the transfer clamps 133 have been opened. FIG. 14 also shows that the shirred casing 147 on the stuffing horn 135 is being stuffed while the foregoing operations are taking place. FIG. 15 shows the trough 152 swung to the discharge position with another shirred casing 147 moved downwardly along the transfer section 136 to a position adjacent the closed transfer clamps 133 while the emulsion clamps 132 are open to permit the passage of the shirred casing 147 onto the stuffing horn 135.

FIGS. 16 and 17 show another embodiment of the invention which is arranged either for fully automatic or for semiautomatic operation. Insofar as possible the same reference characters are employed in describing the construction in FIGS. 16 and 17 that were used in describing the embodiment of the invention illustrated in FIGS. 1 to 7 inclusive.

Referring particularly to FIG. 16, it will be observed that the reference character 10' designates, generally, a horizontal machine for stuffing shirred sausage casings which is provided with a hopper 27' that is supported from the base 11, in part by a support 29' and in part by a bracket 36', the latter being used for other purposes as will be apparent presently. A transfer dog, shown generally at 31', is arranged to move the shirred casings one by one from the curved bottom 26 of the hopper 27' onto the transfer section 16 of the horizontal elongated sausage casing receiving member 14 over the tip 25. The transfer dog 31' includes a head 32' having a depending stem 33' provided with an opening 33" to permit passage relative to the transfer section 16 while moving a shirred casing therealong in advance thereof. The head 32' of the transfer dog 31' is slidable on a pair of guides 34'–34' which are mounted at one end in the bracket 35 and at the other end in the bracket 36'. The operating shaft 37, previously described, with a double spiral groove 38 is arranged to cooperate with a pawl 39 in the head 32' for reciprocating the transfer dog 31' in the manner previously described for the transfer dog 31. This operation is caused by a motor 44' which can be a three phase alternating current motor as illustrated in FIG. 17.

The shirred casings 28' in the hopper 27' are fed one by one by indexing means 30 onto the curved bottom 26 so as to be placed in front of the lower portion of the stem 33' of the transfer dog 31'. For automatically operating the indexing means an index arm 174 is provided and it is rotatably mounted at 175 on the bracket 36'. A spring 176 is arranged to bias the index arm 174 against a stop 177. It will be understood that, as the transfer dog 31' reaches the end of the retraction stroke, a detent 178 extending laterally therefrom engages the index arm 174 and causes it to move therewith during the final portion of this reverse movement. The index arm 174 carries a pawl 179 that engages the teeth of a ratchet wheel 180 which is fast on a shaft 181 that is arranged by suitable gearing to rotate the indexing means 30 through a quarter turn, for example, to cause the next shirred casing 28 to be moved from the hopper 27' onto the curved bottom 26. When the transfer dog 31' is reversed in its movement, it moves the shirred strand on the curved bottom 26 ahead of it and into a guide cone 182 which directs it onto the tip 25 and thence to the transfer section 16 of the horizontal elongated sausage casing receiving member 14.

At the distal or discharge end of the stuffing horn 15 is a casing stop and tabber 185 that is carried by a shaft 186. The casing stop and tabber 185 is provided for causing the outer end of the shirred casing on the stuffing horn 15 to overlie the discharge end and permit the stuffing operation to be performed. Just beyond the discharge end of the stuffing horn 15 a sizer, shown generally at 187, is located. For illustrative purposes it is pointed out that the sizer 187 may comprise a pair of endless belts 188 and 189 that are trained over pulleys 190—190 and 191—191 respectively. As described hereinbefore the sizer 187 is provided to make uniform the size of the stuffed product and for this purpose it is caused to move between the belts 188 and 189 which accomplish this purpose.

In order to permit the full automatic operation of the machine 10′ limit switches are provided at various locations which are responsive to movement of adjacent parts in order to insure that the operating sequence is followed properly and that it is continuous. Limit switches 194 and 195 are located, respectively, adjacent the emulsion clamp assembly 12 and the transfer clamp assembly 13. Normally they are in the open position. The limit switch 194 is arranged to be closed momentarily after the transfer dog 31′ has moved a shirred casing onto the stuffing horn 15 and after it has begun its reverse movement and at a location where it has moved past the emulsion clamps 68 and 69. The limit switch 195 is arranged to be closed momentarily as the transfer dog 31′ moves forwardly and after it has moved past the transfer clamps 103 and 104 in the open position.

Limit switches 196 and 197 are associated with the emulsion clamp assembly 12 and are positioned thereon. The limit switch 196 is arranged to have its contacts closed when the emulsion clamps 68 and 69 are in the closed position. Limit switch 197 is arranged to have its contacts open when the emulsion clamps 68 and 69 are closed.

Limit switches 198 and 199 are mounted on the transfer clamp assembly 13. Limit switch 198 is arranged to have its contacts closed when the transfer clamps 103 and 104 are closed and to have its contacts open when the transfer clamps 103 and 104 are open. Limit switch 199 is arranged to have its contacts closed when the transfer clamps 103 and 104 are open and to have them open when the transfer clamps 103 and 104 are closed.

In order to detect the presence of a shirred casing on the stuffing horn 15 a limit switch 200 is provided. It is arranged to have its contacts closed when a shirred casing is moved onto the stuffing horn 15 by operation of the transfer dog 31′.

Referring now particularly to FIG. 17 of the drawings, the associated relays and circuitry are illustrated for effecting either automatic or semiautomatic operation of the machine 10′ shown in FIG. 16. Here it will be observed that a fused disconnect switch is shown, generally, at 203 that is arranged to connect a suitable source of three phase 60 cycle 220 volts to energize conductors 204, 205 and 206. For operating the transfer dog motor 44′ transfer dog motor relay 207 is provided which has normally open contacts 207a, 207b, and 207c and an operating winding 207w. Overload relays 208 and 209 are provided having normally closed contacts 208a and 209a, respectively, and operating windings 208w and 209w.

The emulsion pump motor 22′, which is here shown as a three phase motor, is arranged to be energized on operation of an emulsion pump motor relay 210 which is provided with normally open contacts 210a, 210b and 210c, normally closed contacts 210d and an operating winding 210w. Overload relays 211 and 212 are provided and have normally closed contacts 211a and 212a and operating windings 211w and 212w respectively.

For operating the control circuits a control transformer shown generally at 213 is employed. It includes a primary winding 213p which is connected for energization between conductors 205 and 206 and a secondary winding 213s which may reduce the voltage to a control voltage of 110 volts. A control circuit fuse 214 is interposed in the output of the secondary winding 213s to protect the same against overload.

For starting and controlling certain of the operations of the machine 10′ a run switch 215 is provided having normally open contacts 215a. In addition there is provided a jog switch 216 for the transfer dog motor 44′ and its includes normally closed contacts 216a and normally open contacts 216b. A stop switch 217 is provided having normally closed contacts 217a. In order to shift from automatic operation to semiautomatic operation a selector switch shown generally at 218 is provided. It includes normally closed contacts 218a and 218c and normally open contacts 218b and 218d. A foot switch 219 having normally open contacts 219a is employed for semiautomatic operation.

In order to control the operation of the emulsion clamps 68 and 69 and the hydraulic operator 91 solenoids 222 and 223 are provided, the former being employed for opening the emulsion clamps 68 and 69 when energized and the latter, when energized, being arranged to close them. The hydraulic operator 116 associated with the transfer clamps 103 and 104 is controlled by solenoids 224 and 225. When the solenoid 224 is energized the hydraulic operator 116 functions to close the transfer clamps 103 and 104 and when the solenoid 225 is energized the hydraulic operator 116 functions to open the transfer clamps 103 and 104.

The control system includes a main control relay 226 which is provided with normally open contacts 226a, 226b and 226c. A dashpot 227 is interposed in the operation of the contacts 226c for the purpose of delaying the closure thereof for a predetermined time after energization of the operating winding 226w.

In order to insure proper sequencing of the operation of the emulsion and transfer clamps 12 and 13 a latch relay 228 is provided. It includes normally open contacts 228a, 228b and 228c and normally closed contacts 228d, 228e and 228f. A latch 229 serves to hold the normally open contacts closed and the normally closed contacts open. For controlling the latch an unlatching winding 230 is provided which, when energized, moves the latch 229 to such position as to permit operation of the contacts of the latch relay 228 to the position shown in FIG. 17 of the drawings.

There is also provided an emulsion clamp relay 231. It has normally open contacts 231a and 231b and an operating winding 213w.

In describing the operation of the machine 10′ shown in FIG. 16 employing the circuit connections illustrated in FIG. 17, it will be assumed that the latch relay 228 is in the unlatched condition shown in FIG. 17, a condition which corresponds to the position of the transfer dog 31′ shown in FIG. 16 where it has moved past the transfer clamps 103 and 104 and has momentarily closed the contacts of limit switch 195 with the operation of the machine 10′ then having been stopped either by operation of the stop switch 217 or by the loss of control voltage from the secondary winding 213s. Under these conditions the emulsion clamps 68 and 69 are closed and, while the transfer clamps 103 and 104 are shown in FIG. 16 in the open position, it will be understood that under the assumed conditions they are closed. Also it is assumed that the selector switch 218 is in the automatic position as shown in FIG. 17.

Next the run switch 215 is depressed momentarily to energize the operating winding 226w of the main control relay 226. This circuit can be traced from one side of secondary winding 213s through contacts 217a of the stop switch 217, contacts 216a of jog switch 216, contacts 215a of the run switch 215 and operating winding 226w back to the other side of the secondary winding 213s. At contacts 226a a sealing circuit is completed for the operating winding 226w and the run switch 215 can be released. After the time delay for which the dashpot 227 is set has expired, i.e., one second, for example, contacts 226c are closed to complete a circuit for energizing solenoid 222 for operating the hydraulic operator 91 to open the emulsion clamps 68 and 69. This circuit can be traced from one side of the secondary winding 213s through contacts 217a, contacts 226c, contacts 210d, contacts 228d, contacts of limit switch 198 through solenoid 222 back to the other side of the secondary winding 213s.

As a result of the opening of the emulsion clamps 68 and 69, the limit switch 197 is closed and the contacts of limit switch 196 are opened. This completes a circuit for energizing the operating winding 207w of the transfer dog motor relay 207 to close its contacts and energize the transfer dog drive motor 44' to rotate the operating shaft 37 and cause forward movement of the transfer dog 31' to move a shirred casing present in advance of the same on the transfer section 116 past the open emulsion clamps 68 and 69 and onto the stuffing horn 15.

The circuit for energizing the operating winding 207w can be traced from one side of the secondary winding 213s through contacts 217a, contacts 226c, contacts 228e, contacts of limit switch 197, winding 207w, contacts 208a, contacts 209a to the other side of the secondary winding 213s.

The transfer dog 31' moves past the open emulsion clamps 68 and 69 to position the shirred strand on the stuffing horn 15 and then its movement is reversed in the manner described and it moves rearwardly past the open emulsion clamps 68 and 69 and thereupon closes the contacts of limit switch 194 momentarily. This completes an energizing circuit for the operating winding 228w of the latch relay 228 and it is energized to close its normally open contacts and to open its normally closed contacts. These contacts are held in these positions by operation of the latch 229 so that, after the contacts of the limit switch 194 are opened, there is no change in the position of the contacts of the latch relay 228 until a subsequent energization of the unlatching winding 230 as will be described.

The circuit for energizing the operating winding 228w can be traced from one side of the secondary winding 213s through contacts of limit switch 194 and operating winding 228w to the other side of the secondary winding 213s.

As the result of the operation of the latch relay 228 contacts 228d, 228e and 228f are opened resulting in deenergization of solenoid 222, operating winding 207w of the transfer dog motor relay 207 and solenoid 224. The contacts of the transfer dog motor relay 207 are opened, the transfer dog motor 44' is deenergized and rotation of the operating shaft 37 ceases together with movement of the transfer dog 31'.

Contacts 228a, 228b and 228c of the latch relay 228 are closed. At contacts 228b a circuit is completed for energizing solenoid 223 to operate the hydraulic operator 91 and cause emulsion clamps 68 and 69 to close.

The circuit for energizing the solenoid 223 can be traced from one side of the secondary winding 213s through contacts 228b and solenoid 223 to the other side of the secondary winding 213s.

As a result of the operation of the emulsion clamps 68 and 69 to the closed position the contacts of limit switch 196 are closed to complete an energizing circuit for operating winding 231w of the emulsion clamp relay 231 and its contacts 231a and 231b are closed.

The circuit for energizing the operating winding 231w can be traced from one side of the secondary winding 213s through the contacts of limit switch 196 and operating winding 231w to the other side of the secondary winding 213s.

One result of the operation of the emulsion clamp relay 231 is to complete an energizing circuit for the operating winding 210w of the emulsion pump motor relay 210. At the same time a circuit is completed for energizing emulsion valve operating winding 20w to open valve 20.

The circuit for energizing the operating winding 210w can be traced from one side of the secondary winding 213s through contacts 218c, contacts of limit switch 200 which are closed since a shirred casing is located on the stuffing horn 15, contacts 226b, contacts 231a, operating winding 210w, contacts 211a, contacts 212a to the other side of the secondary winding 213s. The circuit for energizing the emulsion valve operating winding 20w can be traced from one side of the secondary winding 213s through the circuit previously traced to contacts 231a, and thence through winding 20w to the other side of the secondary winding 213s.

As a result of the energization of the emulsion valve operating winding 20w, the emulsion valve 20 is opened. Since the emulsion pump relay 210 is energized, the closing of its contacts connects the emulsion pump motor 22' for energization to the conductors 204, 205 and 206. As a result the sausage emulsion is pumped through the conduit 19 into the stuffing horn 15 through the emulsion clamp 69. The stuffing operation continues until the shirred strand on the stuffing horn 15 has moved far enough along the same to permit limit switch 200 to open. This opens the previously traced energizing circuits for the emulsion valve operating winding 20w and the operating winding 210w of the emulsion pump motor relay 210. The valve 20 is closed, the emulsion pump motor 22' is deenergized and sausage emulsion ceases to flow through the conduit 19 and through the stuffing horn 15.

In the meantime other operations are continuing. As a result of the closure of contacts 231b of the emulsion clamp relay 231 a circuit is completed for energizing solenoid 225 to open the transfer clamps 103 and 104.

The circuit for energizing the solenoid 225 can be traced from one side of the secondary winding 213s through contacts 228b, contacts 231b and solenoid 225 to the other side of the secondary winding 213s.

As soon as the transfer clamps 103 and 104 are operated to the open position limit switch 199 is closed to again energize the operating winding 207w of the transfer dog motor relay 207. Its contacts are closed and the transfer dog motor 44' is energized from the conductors 204, 205 and 206 to continue the retraction of the transfer dog 31' past the open transfer clamps 103 and 104 and beyond the hopper 27' to pick up the next shirred strand as the result of the operation of the indexing means 30 in the manner previously described.

The circuit for energizing the operating winding 207w in this instance can be traced from one side of the secondary winding 213s through contacts 217a, contacts 226c, contacts 228a, contacts of limit switch 199, operating winding 207w, contacts 208a and 209a to the other side of the secondary winding 213s.

The operation continues with the movement of the transfer dog 31' being reversed at the end of the backward stroke whereupon it moves forwardly to pick up the shirred casing lying on the curved bottom 26 to move it through the guide cone 182 and over the tip 25 onto the transfer section 16 of the horizontal elongated sausage casing receiving member 14. The movement of the transfer dog 31' continues past the open transfer clamps 103 and 104 to place the shirred casing on that part of the transfer section 16 adjacent the closed emulsion clamps 68 and 69. When the transfer dog 31' has cleared the transfer clamps 103 and 104, the limit switch 195 is operated momentarily to close its contacts and complete a circuit for energizing the unlatching winding 230 to operate the latch 229 to the unlatched position. This permits the latch relay 228 to return to the non-operated position.

The circuit for energizing the unlatching winding 230 can be traced from one side of the secondary winding 213s through the contacts of limit switch 195 and unlatching winding 230 to the other side of the secondary winding 213s.

At contacts 228a the previously traced energizing circuit for the operating winding 207w is opened, its contacts are opened and the transfer dog motor 44' is deenergized. As a result the forward movement of the transfer dog 31' stops. At contacts 228b the previously traced energized circuits for the solenoids 223 and 225 are opened and these solenoids are deenergized. Another result of the operation of the latch relay 228 to the unlached position is to close contacts 228f and complete an energizing circuit for the solenoid 224 to operate the hydraulic operator 116 and close the transfer clamps 103 and 104.

The circuit for energizing the solenoid 224 can be traced from one side of the secondary winding 213s through contacts 228f and solenoid 224 to the other side of the secondary winding 213s.

As soon as the transfer clamps 103 and 104 are closed, limit switch 198 is operated to close its contacts to complete partially a circuit for energizing solenoid 222 another part of which was completed on closure of contacts 228d. However, if the stuffing operation is still continuing, no further operation takes place until the contacts of the limit switch 200 are opened following movement of the shirred casing from the stuffing horn 15. As soon as this occurs, as previously described, the emulsion pump motor relay 210 is deenergized and its contacts 210d are closed. As a result the energizing circuit for the solenoid 222 is completed and the hydraulic operator 91 is operated to open the emulsion clamps 68 and 69.

The circuit for energizing the solenoid 222 can be traced from one side of the secondary winding 213s through contacts 217a, contacts 226c, contacts 210d, contacts 228d, contacts of limit switch 198, solenoid 222 to the other side of the secondary winding 213s.

As a result of the operation of the emulsion clamps 68 and 69 to the open position limit switch 197 is operated to close its contacts to complete the previously traced circuit for energizing operating winding 207w of the transfer dog motor relay 207. Following this the transfer dog motor 44' is again energized to drive the operating shaft 37 and thereby the transfer dog 31' forwardly to move the shirred casing past the open emulsion clamps 68 and 69 onto the stuffing horn 15.

The automatic cycle of operation continues to repeat the foregoing sequence of operations. If it is desired to stop the operation at any time, the stop switch 217 can be opened to deenergize operating winding 226w of a main control relay 226 as a result of which the transfer dog motor 44' is deenergized together with the emulsion valve operating winding 20w and the emulsion pump motor 22'. The cycle of operation can be again initiated by depressing the run switch 215 to complete the circuit through its contacts previously described.

In the event that it is desired to operate independently the transfer dog motor 44' and to open and close sequentially emulsion clamps 68 and 69 and the transfer clamps 103 and 104, the transfer dog motor jog switch 216 can be operated. At contacts 216a the necessary energizing circuit for operating winding 226w of the main control relay 226 is opened and energization of emulsion valve operating winding 20w and of operating winding 210 of the emulsion pump motor relay 210 is prevented. The contacts 226c of mian control relay 226 are shunted by contacts 216b making it possible to operate the transfer dog motor 44' continuously with the sequential operation of the emulsion clamps 68 and 69 and of the transfer clamps 103 and 104 in the manner previously described.

When it is desired to operate the machine 10' under semiautomatic operating conditions with the operator controlling the stuffing operation by closing the contacts of foot switch 219, the selector switch 218 is operated to the semiautomatic position. This opens contacts 218a and 218c and closes contacts 218b and 218d. In describing the operation of the system with the selector switch 218 in semiautomatic position it will be assumed that the latch relay 228 is in the unlatched position as shown in FIG. 17 and that the transfer dog 31' has just moved past the open transfer clamps 103 and 104 and has operated the limit switch 195 with the machine having been stopped either by operating the stop switch 217 or by loss of voltage. Under these conditions the emulsion clamps 68 and 69 are closed and also the transfer clamps 103 and 104 are closed. Next the run switch 215 is depressed to close its contacts and it is held closed to maintain the main control relay 226 energized since the sealing circuit through its contacts 226a is no longer completed because contacts 218a of the selector switch 218 are open. However, the functions previously described are completed to open the emulsion clamps 68 and 69 followed by energization of the transfer dog motor 44' to cause the transfer dog 31' to move the shirred casing past the open emulsion clamps 68 and 69 onto the stuffing horn 15 where it operates the limit switch 200 to effect closure of the emulsion clamps 68 and 69 after the transfer dog 31' has completed its forward movement and has started on its return movement to a position past the emulsion clamps 68 and 69 where it operates momentarily the limit switch 194. During the sequence of operations the latch relay 228 is operated to the latched position and a holding circuit is completed for the main control relay 226 at contacts 228c.

The operator then closes the contacts 219a of the foot switch 219 and the circuits for energizing emulsion valve operating winding 20w and the operating winding 210w of the emulsion pump motor relay 210 are completed through contacts 218d to open the valve 20 and energize the emulsion pump motor 22'. The stuffing operation continues until the shirred casing on the stuffing horn 15 moves out of engagement with the limit switch 200 and it is opened to deenergize the emulsion valve operating winding 20w and the operating winding 210w of the emulsion pump motor relay 210. The valve 20 closes and the emulsion pump motor 22' is deenergized.

During the stuffing operation the transfer dog motor 44' continues to operate and moves the transfer dog 31' to the limit of its backward movement, then reversing it and moving a shirred casing deposited on the curved bottom 26 by the indexing means 30 through the guide cone 182 over the tip 25 and onto the transfer section 16 of the horizontal elongated sausage casing receiving member 14 and past the transfer clamps 103 and 104 until the contacts of limit switch 195 are closed momentarily to energize the unlatching winding 230 and operate the latch 229 to permit movement of the latch relay 228 to the deenergized or unlatched position. As a result of this operation the main control relay 26 is deenergized, the transfer dog motor relay 207 is deenergized and the transfer dog motor 44' stops.

After completion of the stuffing operation, the next semiautomatic cycle can be initiated by again operating the run switch 215 to repeat the foregoing cycle.

While the emulsion clamp 12 has been shown in FIG. 16, for example, as including the slidable clamps 68 and 69, it will be understood that the emulsion clamp 12 can be constructed in a manner similar to the transfer clamp 13 having the pivoted clamps 103 and 104. When such a modified construction is employed, the emulsion conduit 19 is connected to one of the swingable clamps forming the emulsion clamp 12 in order to supply the emulsion to the stuffing horn 15 through the transverse port 51 therein in the manner previously described.

As shown in FIGS. 18, 19 and 20 there is a modified construction here illustrated for the depending stem 33' from the head 32' of the transfer dog 31'. The depending stem 33' is rotatably mounted at 234 on a bracket 235 that is secured together with a depending stop 236 to one side of the head 32'. In its forward movement the depending stem 33' moves the shirred casing 28' onto the tip 25 and thence to the transfer section 16 and in so doing it engages curved sections 237—237 on guide cone members 238—238 which are rotatably mounted at 239 on a support 240 which is suitably mounted on the channel base 11 and may extend from the support 29'. A transverse pin 241 limits the extent of movement apart of the guide cone members 238—238 and a coil compression spring 242 acts to bias them toward each other. The transfer dog 31' moves in a forward direction indicated by the arrow 243, FIG. 18, to transfer a shirred casing 28' from the curved bottom 26 onto the tip 25 and thence onto the transfer section 16. In so doing it engages the curved sections 237—237 and spreads the guide cone members 238—238 apart and against the biasing force of the coil compression spring 242. On its return stroke, as indicated by the arrow 244, FIG. 20, the depending stem 33', which previously was held by the stop 236 against rotation when the transfer dog 31' moved in the forward direction, now rotates to the position shown when its lower end engages the guide cone members 238—238 which normally are held in their positions as shown in FIGS. 18 and 20 by the coil compression spring 242.

FIGS. 21, 22 and 23 show in more detail how the casing stop and tabber 185, shown in FIG. 16, is operated conjointly with the movement of the transfer dog 31'. In these figures the tabber means is indicated, generally, at 247 and includes a sector shaped plate 248 which is shown in elevation in FIG. 24. The sector shaped plate 248 is mounted for rotation with a shaft 249 that extends parallel to the axis of the stuffing horn 15 and is located below it and slightly to one side as shown in FIG. 23. At its forward end the shaft 249 is journaled in a bearing 250 that is carried by a support plate 251 which extends upwardly from the channel base 11 and is secured thereto by a support angle 252. A clearance opening 253 is provided near the upper end of the support plate 251 to accommodate the stuffing horn 15 and a shirred casing 28' placed thereon as the result of forward movement of the transfer dog 31'. It will be observed that, on rotation of the shaft 249, the sector shaped plate 248 rotates in a plane that is perpendicular to the longitudinal axis of the stuffing horn 15 and is close to the distal end 254 of the stuffing horn 15.

With a view to gripping the outermost end of the shirred casing 28' on the stuffing horn 15, jaws 255 and 256 are provided on the side of the sector shaped plate 248, FIG. 24, that faces the distal end 254 of the stuffing horn 15. The jaw 255 is stationarily mounted by screws 257 on the plate 248 while the other jaw 256 is rotatably mounted thereon at 258. A pin 259 on the rotatable jaw 256 extends through a slot 260 in the plate 248 where a coil tension spring 261 is connected thereto for biasing the movable jaw 256 toward the stationary jaw 255. The jaws 255 and 256 together provide V-shaped surfaces 262 to facilitate entry of the end of the shirred casing 28' therebetween so that it may be gripped under the biasing action of the spring 261.

The other end of the shaft 249 is suitably journaled on the bracket 35 and it is provided with a sprocket 263 over which a chain 264 is trained. The chain 264 extends over a sprocket 265 on a shaft 266 which extends through the central portion 63 of the support 60 into a gear housing 267 which is suitably mounted on the opposite side. A bevel gear 268 on the shaft 266 meshes with a bevel gear 269 on the transverse shaft 270 to the outer end of which an operating lever 271 is secured. The operating lever 271 is offset at 272 and at its distal end is provided with a generally longitudinally extending groove 273 for receiving the detent 178 on the head 32' of the transfer dog 31' during that portion of its final forward movement and the beginning portion of the reverse movement in a manner to be described presently. The arrangement is such that the operating lever 271 moves through an arc of the order of 45° from its position as shown in FIG. 21 to the position corresponding to the forward movement of the transfer dog 31'. The gear ratio between the bevel gears 268 and 269 and the ratio between the sprockets 263 and 265 are such that the sector shaped plate 248 is swung through 180° from the position shown in FIG. 21 by full lines to the position here shown by broken lines where it is placed immediately adjacent the distal end 254 of the stuffing horn 15 so that, as the shirred casing 28' is moved along the stuffing horn 15, its outer end engages the juxtaposed surface of the plate 248 and deflects it.

FIG. 25 shows the position of the sector shaped plate 248 when it has been rotated to its uppermost position which corresponds to the full forward movement of the transfer dog 31'. Here it will be observed that the shirred casing 28' has been moved onto the stuffing horn 15 and its outer end engages the plate 248. Now on reverse movement of the transfer dog 31', the detent 178 shifts the operating lever 271 to rotate in the opposite direction thereby rotating the shaft 249 and with it the sector shaped plate 248 as shown in FIG. 26. The outer end of the shirred casing 28' is clamped between the jaws 255 and 256 and is pulled over the distal end 254 of the stuffing horn 15. In order to open the jaws 255 and 256 and release the end of the shirred casing 28' gripped therebetween a clean out pin 274 is provided and it is pivotally mounted at 275 on a bracket 276 which is carried by the support plate 251. A coil tension spring 277 serves to hold the clean out pin 274 against a stop 278 which prevents rotation in one direction while permitting it in the opposite direction. For example, when the sector shaped plate 248 is rotated in the direction indicated by the arrow 279, FIG. 25, during the forward movement of the transfer dog 31', it moves past the distal end of the clean out pin 274 and rotates it in the direction indicated by the arrow 280 and tensions the spring 277. Now, when the sector shaped plate 248 is rotated in the direction indicated by the arrow 281, FIG. 26, the stop 278 holds the clean out pin 274 against rotation and, as the jaws 255 and 256 pass the clean out pin 274, the jaw 256 is pivoted away from the jaw 255 to release the end 282 of the shirred casing 28'. As shown in FIGS. 26, 27 and 28, the end 282 of the shirred casing 28' is unshirred for a number of pleats and caused to extend at right angles over the distal end 254 of the stuffing horn 15. Then, when the stuffing emulsion is caused to flow through the stuffing horn 15, it does not flow out of the outer end of the shirred casing 28'.

Referring to FIG. 21 it will be observed that the operating lever 271 is rotated in the direction indicated by the arrow 283 during the time that the transfer dog 31' is moving forwardly in the direction indicated by the arrow 284. During this forward movement, as pointed out hereinbefore, the sector shape 248 is rotated from its lowermost position through 180° to its uppermost position. Then, as the transfer dog 31' is moved in the opposite direction, the operating lever 271 is rotated in the opposite direction back to the position shown in FIG. 21. During this time the tabber means 247 is operated as illustrated in FIGS. 25, 26, 27 and 28, as described hereinbefore.

Since certain changes can be made in the foregoing apparatus and method and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. In a machine for stuffing shirred sausage casings, in combination, an elongated sausage casing receiving member having a stuffing horn at one end and a transfer section at the other end, said member having a longitudinal opening at said one end comprising said stuffing horn and a transverse port intermediate said ends opening into said longitudinal opening, means for selectively directing flow of sausage emulsion through said port for discharge out of said stuffing horn, at least two releasable holding means spaced along said receiving member and holding the same against movement, and means for alternately releasing said holding means to permit movement of a shirred casing from said transfer section to said stuffing horn.

2. A machine as defined in claim 1 which includes means for effecting movement of a shirred casing from said transfer section to said stuffing horn.

3. A machine as defined in claim 2 in which said receiving member holding means includes a first holding means releasably engageable with said receiving member intermediate its ends to hold the same against movement and a second holding means releasably engageable with said transfer section to hold the same against movement, said holding means being alternately released during movement of said casing moving means to permit movement of a shirred casing from said transfer section to said stuffing horn.

4. A machine as defined in claim 2 which includes means for moving shirred casings successively into alignment with the transfer section end of said casing receiving member, and means for moving an aligned shirred casing onto said transfer section.

5. A machine as defined in claim 4 in which the elongated sausage casing receiving member is horizontally positioned and the shirred casings are horizontally disposed for movement into alignment therewith.

6. A machine as defined in claim 4 in which the elongated sausage casing receiving member is vertically positioned and the shirred casings are vertically disposed for movement into alignment therewith.

7. A machine as defined in claim 2 in which one of said holding means comprises clamp means engageable with said receiving member at said transverse port and having a passage for directing flow of sausage emulsion into said port.

8. A machine as defined in claim 2 in which said holding means comprises first and second clamp means, said first clamp means being positioned to engage said receiving member at said transverse port and including means to direct sausage emulsion into said port, said second clamp means being engageable with said transfer section to hold said receiving member against endwise movement, and said casing moving means being operated in coordination with the movement of said clamp means to move a shirred casing along said receiving member past each of said clamp means when in a released position.

9. A machine as defined in claim 2 which includes tabber means at said stuffing horn and means responsive to the operation of said shirred casing moving means for operating said tabber means.

10. A machine as defined in claim 9 wherein the tabber means includes a plate rotatable about an axis along and spaced from the longitudinal axis of the stuffing horn and in a plane juxtaposed to its discharge end, and jaw means for gripping an end of the casing and unshirring a portion thereof over said discharge end.

11. A machine as defined in claim 10 wherein the jaw means includes a pair of jaws relatively movably mounted on the plate and biased toward each other, and a clean-out pin cooperating with said jaws to separate them and release the end of the casing at a predetermined part of the rotary movement of said plate.

References Cited in the file of this patent
UNITED STATES PATENTS

| | | |
|---|---|---|
| 1,616,971 | Henderson | Feb. 8, 1927 |
| 2,169,412 | Freeman | Aug. 15, 1939 |
| 2,231,954 | Scherubel | Feb. 18, 1941 |
| 2,863,167 | Nordin | Dec. 9, 1958 |
| 2,922,186 | Sartore | Jan. 26, 1960 |